Oct. 23, 1956
A. J. C. BUETTNER
2,767,968
PROTECTIVE DEVICE FOR THE MASTER CYLINDER
OF HYDRAULIC BRAKE SYSTEMS
Filed Feb. 26, 1953
2 Sheets-Sheet 1
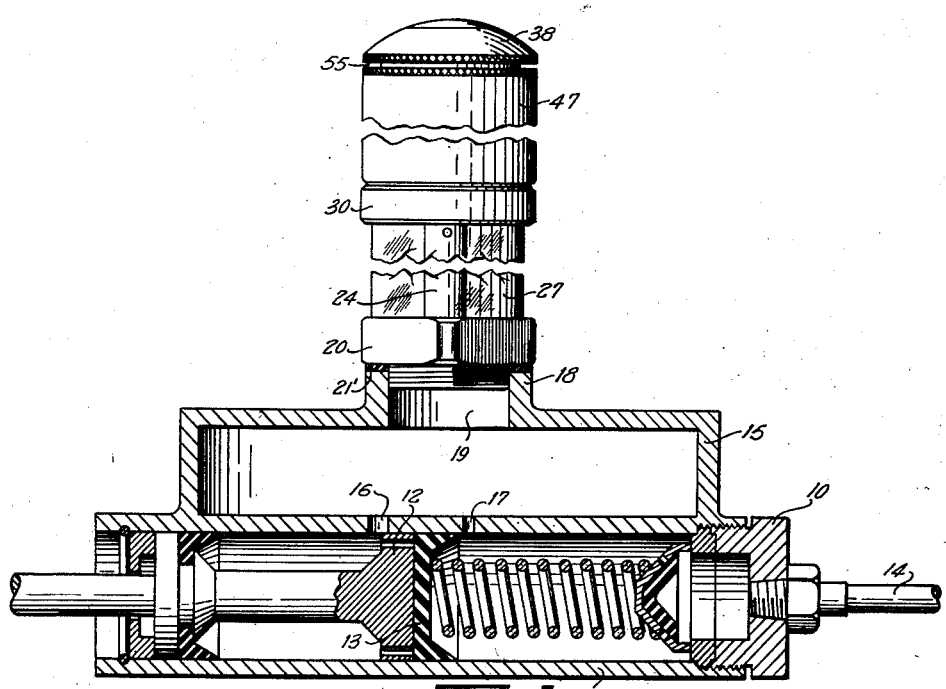
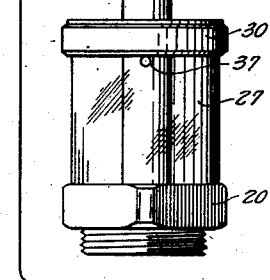
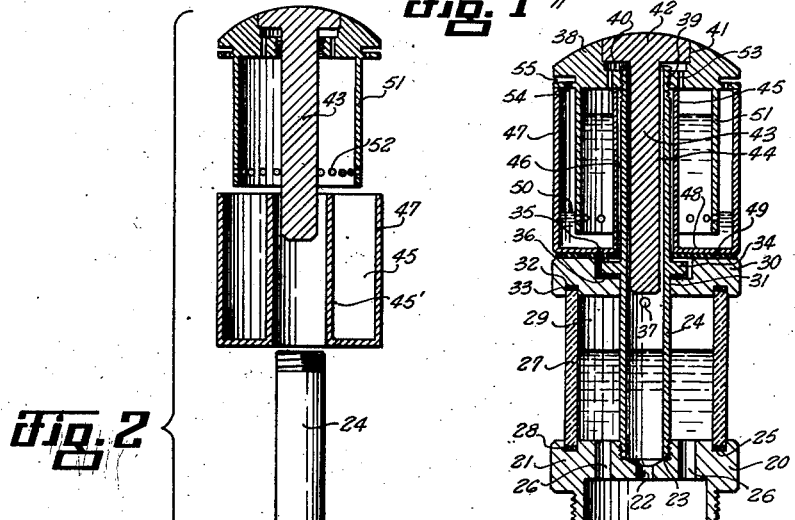
INVENTOR.
Arthur J. Collins Buettner
BY
Ehley & Ehley
ATTORNEYS

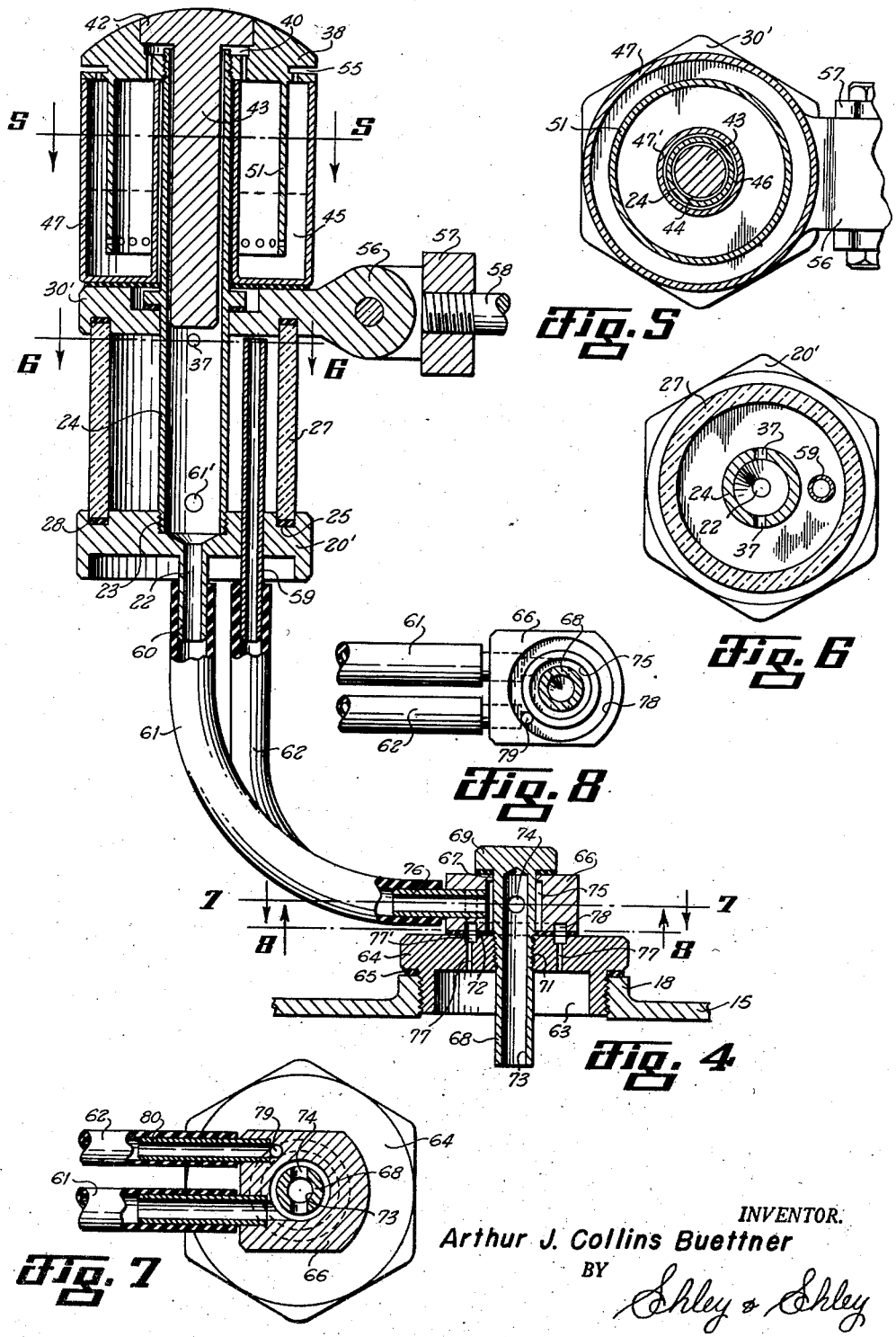

United States Patent Office 2,767,968
Patented Oct. 23, 1956

2,767,968
PROTECTIVE DEVICE FOR THE MASTER CYLINDER OF HYDRAULIC BRAKE SYSTEMS

Arthur J. Collins Buettner, Dallas, Tex.

Application February 26, 1953, Serial No. 339,105

6 Claims. (Cl. 261—121)

This invention relates to new and useful improvements in protective devices for the brake fluid of hydraulic brake systems.

In the conventional hydraulic brake system employing a master cylinder actuating a plurality of wheel cylinders by means of a brake fluid, normally composed of alcohol and glycol, malfunctioning and brake failures have been encountered due to abrasion and corrosion of the master cylinder and/or the wheel cylinders. The master cylinder is normally mounted on the underside of the vehicle chassis, often beneath the body floor, but sometimes immediately forward thereof in the rearward part of the engine compartment, and in such location, the master cylinder is subjected to road dust, to the splashing of mud and water, and is not readily accessible for inspection or refilling with brake fluid. Each actuation of the master cylinder necessarily causes the breathing of air into and out of the master cylinder enclosure, and such action results in the introduction of moisture and dirt or dust into the enclosure and into the brake fluid. The moisture causes corrosion of the master and wheel cylinder walls while the dust and dirt cause abrasion. Both destroy the smooth finish of the cylinder walls and result in damage to the master brake pistons along with ultimate failure of the brake system. Changes of atmospheric temperature cause condensation to occur within the master cylinder enclosure, thus introducing water thereinto, and the water, besides creating corrosion, is also subject to freezing so as to impair or block operation of the master or one or more of the wheel cylinder pistons.

Further, the necessary venting of the master cylinder enclosure permits the lighter constituents of the brake fluid to evaporate therefrom whereby the brakes become sluggish and difficult to operate, and in cold climates, may become so stiff as to be virtually useless. Still further, the usual location of the master brake cylinder causes inspection thereof and determination of the level of brake fluid therein to be a difficult and time consuming process with the result that adequate inspection of the fluid level is not carried out as frequently and properly as might be desired.

In view of the foregoing, it is one object of this invention to provide an improved protective device for master cylinders of hydraulic brake systems which permits quick and ready determination of the quantity of brake fluid in the system.

Another object of the invention is to provide an improved protective device for master cylinders which permits determination of the rate of usage of brake fluid whereby the presence of leaks or other causes for loss of brake fluids are readily determined.

A particular object of the invention is to provide an improved protective device in which the addition of brake fluid to the brake system is greatly facilitated, in which complete filling of the system is assured, and in which a reserve supply of brake fluid is provided.

An important object of the invention is to provide an improved protective device for master cylinders in which the brake system including the master cylinder is protected against dust, dirt and moisture by a liquid seal which excludes the outside atmosphere, with its dust and moisture content, from the system, and in which any outside air ultimately drawn into the system is subjected to a scrubbing and cleaning through a liquid bath whereby dirt and moisture is effectively removed therefrom.

An additional object of the invention is to provide an improved device of the character described in which the sealing and cleaning liquid is confined within a quickly and readily removable container whereby the liquid is easily inspected or replaced, and whereby sediment or other collections in the container are easily cleansed or removed therefrom.

A still further object of the invention is to provide an improved device of the character described wherein the volume of air trapped within the device is held at a minimum to reduce the possibility of moisture condensation therefrom, and wherein such air is effectively insulated from atmospheric temperature changes, also to reduce the possible condensation of moisture to a minimum.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a side elevational view of a protective device constructed in accordance with this invention, the device being shown attached directly to a master cylinder, the latter being shown in vertical, longitudinal section, Fig. 2 is an exploded view of the protective device illustrating the partial disassembly thereof, Fig. 3 is a vertical, transverse, sectional view of the device showing brake and sealing fluid therein and illustrating the functioning of the sealing fluid as additonal air is drawn into the device, Fig. 4 is a vertical, transverse sectional view of a modified form of the protective device adapted for utilization in instances where the device cannot be connected directly to the master cylinder, and Figs. 5, 6, 7 and 8 are horizontal, cross-sectional views taken upon the respective lines of Fig. 4.

In the drawings, the numeral 10 designates a master cylinder of the usual and conventional type as utilized in hydraulic brake systems. The cylinder structure or enclosure includes a brake actuating cylinder 11 having therein a piston structure 12 provided with a piston cup 13, normally formed of rubber or other suitable or similar material. A pressure fluid outlet line 14 leads from the cylinder 11, and as the brake system is actuated, the piston structure 12 is moved in the cylinder toward the outlet line 14 so as to force brake fluid under pressure into the line and thus energize the individual brake cylinders upon the individual wheels of the vehicle. The conventional master cylinder structure includes a housing 15 forming a reserve brake fluid chamber above the cylinder 11 and communicating therewith through a pair of ports 16 and 17. As illustrated, the port 16 leads to the portion of the cylinder 11 disposed rearwardly of the piston 12 at all times, the port functioning to admit fluid to the space as the piston is moved forwardly toward the outlet line 14 to energize the brake system. The port 17 is exposed to the forward or pressure side of the piston cup 13, being positioned closely adjacent the piston when the latter is in its retracted position, but nevertheless, being in communication with a portion of the cylinder 11 within which pressure is developed as the brake system is energized and remaining in such communication until the piston 12 has been moved a short distance toward the outlet end of the cylinder. Thus, when the brake system is actuated by movement of the piston, there will be a short interval during which fluid will flow from the cylinder upwardly through the port 17 into the reservoir housing 15. Similarly, during the final portion of the retraction or de-energization of the piston, there will be a short period when fluid is drawn into the cylinder from the reservoir through the port 17. It is this surging of fluid back and forth through the port 17 that causes dirt and moisture to be breathed into the fluid reservoir of the conventional master cylinder. Of course, the dirt and moisture both find their way into the cylinder 11 through the ports 16 and 17 and result in the creation of errosive and corrosive conditions therein. When the cylinder 11 is made, the walls thereof are given a fine and extremely smooth finish so that the piston cup 13 operates therein without pressure loss and with utmost efficiency. Abrading of the cylinder walls, or the pitting thereof by corrosion processes, on the other hand, soon reduces the efficiency of the seal between the cylinder wall and the piston, and further, tends to damage and cut the lips of the cup 13 so as to impair proper brake action and reduce the braking forces available. In extreme cases, the cup 13 may be so damaged as to lose the ability to function, and complete failure of the brake system may occur. Similarly, if the level of the brake fluid in the master cylinder enclosure falls below the horizontal plane represented by the ports 16 and 17, the cylinder will not be entirely filled with the brake fluid and poor or totally inadequate braking action may ensue.

The conventional master cylinder enclosure is provided on its upper surface with an upstanding boss 18 having an internally screw-threaded bore 19 through which brake fluid may be added to the cylinder enclosure, and through which inspection may be made as to the need or necessity for adding additional fluid. This opening is normally closed by a screw-threaded vented cap (not shown). The closure plug is provided with a small vent or air breathing opening, and it is through this vent that dirt and moisture normally enter the master cylinder enclosure. In many instances, the master cylinder is so positioned upon a vehicle that direct inspection of the interior of the enclosure through the opening 19 is not possible or feasible, whereby determination of the level of brake fluid in the enclosure is often carried out only by removal of the plug and a dipping of a finger into the housing 15 to determine whether or not a body of fluid therein can be reached and felt by the finger. Obviously, such inspection method is inaccurate and subject to error, and in no event, provides an accurate gauge of the fluid level.

The structures described thus far are old and conventional in the art, and have been described in order that the utilization and advantages of the present invention may be set forth more clearly. The protective device illustrated in Figs. 1 through 3 of the drawings is adapted for direct mounting upon the master cylinder enclosure and includes a base member or plug 20 which is screw-threaded and adapted to be received within the screw-threaded bore 19 of the boss 18, as shown in Fig. 1. The plug is provided with an enlarged head 21 which overlies the upper surface of the boss 18, and a suitable gasket 21' is confined between the head and the boss to provide a liquid and gas tight seal.

A passage 22 extends axially through the center of the plug 20 and opens into an enlarged, screw-threaded counterbore 23 formed in the upper surface of the plug. The counterbore receives the lower, screw-threaded end of an elongate filler tube 24 projecting vertically upwardly from the plug 20.

The plug also is provided on its upper face with an annular recess 25 adjacent the outer margin of the head 21, and a pair of diametrically opposed ports 26 positioned between the counterbore 23 and the groove 25 extend through the plug parallel to the axis thereof. Communication between the upper and lower faces of the plug is thus established through the ports 22 and 26.

An open-ended, cylindrical sight glass 27, formed of glass, plastic, or other suitable transparent or translucent material, has its lower end received within the annular groove 25 and rests upon a suitable gasket 28 disposed in said groove. Being positioned concentrically around the tube 24, the sight glass 27 encloses an annular reservoir chamber 29 above the plug 20. The upper end of the reservoir is closed by a transverse, circular head member 30 having a central bore 31 through which the tube 24 extends and a downwardly facing, annular groove 32 adjacent its outer margin and in vertical alinement with the sight glass 27. The upper end of the sight glass is received within the groove 32 and engages therein a suitable gasket ring 33 for insuring an adequate seal between the sight glass and the head member.

For holding the head member in position and retaining the sight glass clamped between said head member and the plug 20, the tube 24 is provided with an outwardly extending radial flange 34 which engages within a circular recess 35 formed in the upper surface of the head member and into which the central bore 31 opens. A gasket member 36 is received between the underside of flange 34 and the bottom of the recess 35 for sealing the joint thus constituted. It is apparent that as the lower end of the tube 24 is screwed downwardly into the counterbore 23, the flange 34 will urge the head 30 downwardly, thus clamping the sight glass 27 securely between the head and the base member or plug 20. An air vent 37 in the wall of the tube 24 establishes communication between the interior of the tube 24 and the upper portion of the annulus 29 immediately beneath the head 30.

The tube 24 projects upwardly above the head member 30 and has its upper end screw-threaded to receive a domed cap member 38 having a flat lower surface and a spherical upper surface. The cap member is formed with a central, screw-threaded bore 39 for receiving the screw-threaded upper end of the tube 24, the bore opening into an enlarged axial recess 40, and the latter, in turn, opening into a counterbore 41 extending through the upper surface of the cap. A plug member has its head 42 seated in the counterbore 41, as by a press fit or otherwise, and its elongate, cylindrical, solid shank 43 extending downwardly within the bore of the tube 24. As shown in Fig. 3, the plug 43 has a relatively close fit within the tube 24 whereby a relatively restricted annular space 44 of small volume is provided between the plug and the inner wall of the tube. The plug 43 extends downwardly within the tube to a point closely above the air vent opening 37, and thus, communication between the recess 40 and the vent 37 is provided through the restricted annulus 44.

The cap 38 clamps a liquid seal receptacle or cup 45 in position upon the upper surface of the head member 40, the receptacle including an inner, cylindrical wall or sleeve 45' surrounding and being spaced slightly outwardly from the outer wall of the tube 24 to provide an annulus or dead air space 46 therebetween. The receptacle also includes an outer cylindrical wall 47 joined at its bottom to the lower end of the inner wall 45' by an annular bottom plate or wall 48, and being in substantial vertical alinement with the margin of the cap 38 and the margin of the head member 30. A suitable ring gasket 49 is positioned between the bottom wall 48 of the receptacle and the upper surface of the head 30 to seal the joint therebetween. The cap 38, by engaging the upper edges of the cylindrical wall members 45' and 47, urges the liquid seal receptacle downwardly upon the gasket 49 as the cap is screwed onto the upper end of the tube 24, and hence, secures the receptacle or cup in position around said tube.

The liquid seal receptacle constitutes an annular cup adapted to receive a body of suitable sealing liquid 50, which may be brake fluid or any other suitable material. Obviously, it is desirable that the liquid be miscible with brake fluid, that it be non-aqueous, or at least exert no appreciable water vapor pressure, that it have a depressed freezing point and not be excessively volatile, and that it have a moderate viscosity index. Though not essential, it is also desirable that the liquid be miscible with water in order that water vapor be more readily extracted from air passing or bubbling through the liquid.

In order to complete the liquid seal, the cap member 38 carries a depending annular skirt 51 extending downwardly into the space between the inner and outer walls 45' and 47 of the liquid seal receptacle and terminating a short distance above the bottom 48. The skirt 51 is desirably provided with a plurality of restricted, radial openings 52 adjacent its lower end. Further, in order to complete the venting passage, the cap 38 is provided with a plurality of restricted openings 53 extending downwardly from the recess 40 into the interior of the liquid seal receptacle outwardly of the inner wall 45', as shown in Fig. 3, and a plurality of restricted passages 54 extending upwardly in the outer margin of the cap from the space between the outer wall 47 and the skirt 51. The cap carries a peripheral groove 55 extending inwardly from the outer margin of the cap and into which the restricted openings 54 open. Thus, the portion of the liquid 50 between the skirt 51 and the outer wall 47 is vented to the atmosphere through the openings 54 and the groove 55, while the portion of the liquid between the skirt and the inner wall 45' is vented to the recess 40 through the restricted openings 53.

In the operation of the protective device, the latter is affixed upon the master cylinder enclosure, as shown in Fig. 1, the cap 38 is removed, thereby removing in one operation the skirt 51 and the plug 43, and permitting, if desired, the removal of the liquid seal receptacle 45, as shown in Fig. 2. Suitable brake fluid is introduced into the upper end of the tube 24, and added until the housing 15 of the cylinder enclosure is filled and the fluid is brought to a suitable level within the sight glass 27. Desirably, fluid may be added until it stands at a level a short distance below the vent opening 37. If any sediment is present in the receptacle 45, the latter may be thoroughly cleansed, and a suitable quantity of sealing liquid added thereto, as shown in the upper portion of Fig. 4 of the drawings.

The device is now reassembled by simple positioning of the receptacle 45 upon the tube 24 and screwing of the cap 38 into place. The latter step at the same time positions the plug 43 and the skirt 51 properly within the device, and it is thus seen that the structure consists basically of only three elements, the sight glass structure, the liquid seal receptacle, and the cap structure.

Now, as the brake system is utilized and surging of brake fluid takes place into and out of the housing 15 through the port 17, the liquid level within the sight glass 27 may rise and fall, venting and drawing in air through the annulus 44, the recess 40, and the restricted ports 53. Equalization of pressures within and without the lower portion of the tube 24, of course takes place through the vent opening 37.

The air thus surging into and out of the sight glass 27 and the tube 24 is not air from the outside atmosphere, but is air trapped above the liquid 50 between the skirt 51 and the inner wall 45' of the receptacle 45. No dust or dirt can enter this volume of air from the outside atmosphere, nor can any additional water vapor be introduced thereinto other than what is originally present therein. The various restricted vent passages, along with the utilization of the plug 43, cause this volume of air to be relatively small and to include to a large extent only that air present above the liquid 50 between the skirt 51 and the inner wall 45'. Manifestly, such a small volume of air could not contain more than a very small quantity of vapor, dust, or other foreign material. Because of the constant exposure of this air to the liquid 50, it is further readily apparent that most if not all of the dust particles would be trapped in the surface of the liquid 50 and hence prevented from having any adverse effect. In addition, if the liquid 50 is water miscible, the water vapor will also be retained and held almost completely by the liquid. In this manner, the master cylinder structure is sealed and completely isolated from the outside atmosphere, and yet provision is made for the necessary air surging or venting as the brake system is operated.

The sight glass 27 provides several advantages, the first being instant determination of the brake fluid supply by simple observation of the sight glass. So long as the liquid level is visible in the sight glass, the vehicle operator knows that adequate brake fluid is available. There is no possibility of receiving an erroneous indication due to the trapping of air in the structure below the sight glass since during the filling operation as well as during subsequent use of the protective device, any air present in the system will be vented upwardly through the opening 19, through the ports 26 or the port 22, and into the space above the brake fluid within the sight glass.

By periodic observation, the sight glass also gives a definite indication as to whether or not brake fluid is being used at an excessive rate or is leaking from the system. A noticeable drop in the liquid level from one week to the next indicates that a fluid leak exists, and hence, the operator is warned of a leak before the same can lead to brake system failure.

Thirdly, being made of glass or plastic, the sight glass has reasonably good thermal insulating qualities and tends to isolate the lower portion of the protective device from external temperature changes. Such isolation minimizes the condensation of water vapor from air drawn into the device as brake fluid is expanded.

The provision of the dead air space 46 in the upper portion of the device also functions as a thermal barrier and protects the upper portion of the tube 24, as well as the annulus 44 from temperature changes. Here again, condensation is avoided and is restricted to the area exterior of the inner wall 45' so that any condensed water will be trapped by the liquid 50.

Over a long or extended preiod of use, any hydraulic brake system may be expected to consume or expend the brake fluid whereby the level of the fluid will fall within the sight glass, as shown in Fig. 3. As this occurs, the liquid 50 is drawn into an unbalanced condition, as shown in the upper portion of Fig. 3, but yet, the liquid seal is maintained over extended periods.

Eventually, however, a point will be reached in which outside air must be drawn into the device, and the annulus of restricted openings 52 is provided for this purpose. As the liquid level on the outside of the skirt 51 falls, air will eventually reach the openings 52 and pass therethrough. Because of the multiplicity of the openings and their small size, however, the air will enter in the form of very small bubbles and will be required to pass upwardly through the relatively high column of fluid on the inside of the skirt 51. In this process, the air is cleansed and scrubbed, and much, if not all, of the dirt and water will be removed therefrom. This material falls into the bottom of the receptacle 45 and accumulates therein for later removal. It is, however, promptly removed to a point where it can do no damage.

Such contraction and expansion of the air contained within the device may also occur during long time temperaure changes, as for instance, during seasonal variations in the weather. During the hot summer months, the air and brake fluid tend to expand, and the condition illustrated in Fig. 3 may be reversed with the liquid column inside of the skirt 51 being depressed until air can be exhausted outwardly through the openings 52. During the winter months when the air is cooled and contracts, additional outside air may be drawn inwardly through the ports 52, and Fig. 3 thus indicates not only the conditions which occur as brake fluid is used, but also conditions which may result from cold weather operation. Because of the extremely small volume of air trapped within the protective device, venting of air into or out of the device due solely to seasonal weather changes is highly unlikely, but nevertheless, provision therefor is made with the further provision that the liquid seal is instantly re-established and maintained thereafter.

In Figs. 4 through 8 of the drawings, there is shown a modification of the invention adapted for use in instances where the protective device cannot be mounted directly upon the upper portion of the master cylinder enclosure. This is the situation most often encountered. At the present time, a major portion of brake systems have the master cylinder so mounted that the upper portion thereof is obstructed by portions of the vehicle body, and indeed, the master cylinder may closely underlie the floor of the vehicle body. Obviously, under such conditions, adequate inspection of the cylinder and the brake fluid level therein is rendered extremely difficult, and the cylinder enclosure is exposed to all of the dust, water and mud thrown up beneath the vehicle.

In this modification, the essential structure of the protective device is identical to that previously described, a few minor modifications being made to adapt the device to location remote from the master cylinder. Thus, the head member 30 is replaced by a substantially identical head member 30', constructed in the same manner as the head member 30 but having in addition, a laterally extending apertured lug 56 suitably connected to a clevis 57 having a mounting bolt 58. By means of this structure, the protective device can be secured to the forward side of the engine compartment fire wall in any suitable or convenient location, the lug and clevis connection permitting proper positioning of the protective device in a vertical or upright attitude.

The base member 20 also is replaced by a simple base plate 20' having formed therein the annular groove 25 for receiving the sight glass 27, and the screw-threaded recess 23 for receiving the lower end of the tube 24. The passages 26 are omitted, and instead, a vent tube 59 extends upwardly through the base member 20 between the tube 24 and the sight glass 27 to a point closely adjacent the underside of the head member 30'. Further, the passage 22 is extended downwardly from the recess 23 through an elongate axial nipple 60 depending from the center of the base member 20'. In addition to the vent opening 37, the tube 24 is provided with a drain port 61', extending radially through the wall of the tube immediately above the upper surface of the base member 20 and functioning to drain brake fluid from the sight glass into the tube and the recess 23.

To provide for connection of the protective device to the master cylinder enclosure a hose 61 is connected to and extends downwardly from the brake fluid supply nipple 60, and a similar hose 62 is connected to and extends downwardly from the lower end of the vent tube 59. The hoses 61 and 62 are, of course, of such length as to extend from the protective device, wherever it may be positioned, to the master brake cylinder enclosure.

A special fitting is provided for connecting the hoses properly to the master cylinder and includes a screw-threaded plug or closure member 63 adapted to be received within the screw-threaded boss 18 formed in the upper wall of the housing 15 of the master cylinder enclosure 15, as shown in the lower portion of Fig. 4. The plug 63 is formed with an enlarged hexagonal head 64 and a suitable gasket 65 seals the joint between the head and the upper face of the boss 18.

A connection block 66 is disposed upon the upper surface of the head 64 and is provided with a central vertical bore 67 for receiving the tubular shank 68 of a headed securing bolt 69. A gasket 70 is positioned between the head of the bolt and the upper surface of the block. The shank 68 of the bolt extends downwardly through the block and has its medial portion screw-threaded for reception in a screw-threaded opening 71 formed centrally of the head 64 of the plug 63, and manifestly, tightening of the bolt in position will clamp the block 66 to the upper portion of said plug. Again, a suitable sealing gasket 72 is positioned between the block and the head 64.

The tubular shank of the bolt extends downwardly from the plug 63 a short distance into the housing 15 and is provided with an axial bore 73 extending upwardly from its lower end and terminating at the head 69. Radial ports 74 are formed in the wall of the shank and extend from the bore 73 into an annular recess 75 formed around the bore 67 to provide a brake fluid flow space. A short nipple 76 extends from the recess 75 laterally from the block 66 and receives upon its outer extremity the lower end of the hose or tube 61.

The plug 63 is also provided with vent openings 77 spaced radially outwardly from the central bore 71 and extending vertically upwardly through the head 64 into a groove 77' which registers with an annular groove 78 formed in the underside of the block 66, the gasket 72 being suitably apertured to provide communication between the groove 77' and the groove 78. A vent opening 79 extends upwardly in the block from the groove 78 and communicates with the inner end of a short nipple 80 extending laterally from the block and receiving on its outer end the lower portion of the vent tube 62.

In this modification of the invention, as fluid is added through the protective device, the same flows downwardly through the tube 24, entering the hose or connector 61 and passing through brake fluid filling passage formed by the nipple 76, the recess 75 and the ports 74 along with the bore 73 of the tubular bolt shank 68, to fall into the reservoir housing 15 of the master cylinder. At the same time, air is vented from the housing 15 upwardly through the air vent passage including the ports 77, the grooves 78, the passage 79, the nipple 80, and the hose 62, whereby the vented air is conducted upwardly to the tube 59, through the vent opening 37, and out the upper end of the tube 24. Thus, the possibility of an air or vapor lock occurring in one or both of the tubes 61 and 62 is precluded and complete filling of the system with brake fluid is insured. After the cylinder enclosure is filled and the level of the brake fluid has moved upwardly through the tubes 61 and 62 into the protective device, filling the space within the sight glass 27 takes place through the opening 61' and thus the filling is continued and completed as described hereinbefore until the level stands a little below the vent opening 37.

The operation, advantages and benefits of this modified form of the invention are the same as those previously recited in connection with the first described form of the invention. In addition, the protective device may be mounted at any desired location and connected to the master cylinder enclosure by the hoses 61 and 62. Thus, the protective device may be mounted high upon the engine compartment firewall where it is relatively free of contact with dirt and moisture thrown up from beneath the vehicle, and further, whereby frequent and adequate inspection of the brake fluid level is facilitated. It is to be noted that should one of the hoses 61 or 62 part or become disconnected, no damage to the brake system would result and the operation thereof would not be affected. There would still remain more than adequate brake fluid in the system for operation long past the time the hose failure would be detected through routine inspection, and further, no more dirt and moisture could be introduced into the brake system through the restricted passages provided by the ports 77 and the ports 74 than would be introduced into the brake system prior to connection of the protective device thereto.

It is to be noted that the block 66 is rotatable upon the head 64, and therefore, after the plug 63 is tightened into place, the bolt 69 may be lossened in order to permit turning of the block so that the nipples 76 and 80 will face as desired for connection to the hoses 61 and 62. Tightening of the bolt then secures the block in this adjusted position. The annular groove 78 and the annular recess 75 make such rotation feasible.

It is also pointed out that the extension of the tube 24 to the base members 20 or 20' directs the bulk of added brake fluid to the master cylinder enclosure so that the venting of air from the enclosure during filling is not impeded or stopped. This is especially important in the form shown in Fig. 4 because the entry of fluid into the vent tube 59 might well create an air lock and prevent complete filling of the cylinder enclosure.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A protective device for the master cylinders of hydraulic brake systems including, a filling tube extending downwardly for connection to a master cylinder enclosure, a liquid seal cup around the tube, a cap member closing the upper ends of the tube and cup, a plug carried by the cap member and depending into the tube, there being an annular space between the plug and the tube, and a depending liquid seal skirt carried by the cap member and extending downwardly therefrom into the cup, the device having air vents from the exterior thereof and from the tube into the cup on opposite sides of the skirt.

2. A protective device for the master cylinder of hydraulic brake systems including, a filling tube extending downwardly for connection to a master cylinder enclosure, a head member carried by the filling tube intermediate its ends the upper portion of the filling tube extending upwardly from the head member, a cap member closing the upper end of the filling tube and removably attached thereto, an open-top closed-bottom liquid seal cup resting upon the head member, the cup having interiorly thereof an upstanding sleeve opening through the closed bottom of the cup and receiving the upper portion of the filling tube, there being a space between the sleeve and tube closed at its upper and lower ends, the cap member engaging the cup to close the upper end thereof and hold the cup on the head member, a plug depending from the cap into the filling tube and being spaced from the inner wall thereof, and an annular liquid seal skirt depending from the cap member into the cup, the device having an air vent from the tube to the cup inside of the skirt and an air vent from the cup outside of the skirt to the atmosphere.

3. A protective device for the master cylinders of hydraulic brake systems including, walls enclosing a reservoir chamber having a brake fluid conductor extending downwardly for connection to a master cylinder enclosure, a filling tube extending upwardly through the reservoir chamber from the bottom thereof, the filling tube projecting above the reservoir chamber and having a port open to the reservoir chamber, a liquid seal cup around the portion of the tube projecting above the reservoir chamber, a cap member closing the upper ends of the tube and cup, a depending liquid seal skirt carried by the cap member and extending downwardly therefrom into the cup, the device having air vents from the exterior thereof and from the tube into the cup on opposite sides of the skirt, a fitting constructed for positioning in the filling opening of a master cylinder enclosure and having an air vent passage and a brake fluid filling passage extending below the air vent passage, the filling passage being connected to the brake fluid conductor of the reservoir chamber, and a venting conductor leading from the air vent passage to the upper portion of the reservoir chamber.

4. A protective device for the master cylinder of hydraulic brake systems including, a brake fluid reservoir having a translucent side wall and a brake fluid conductor extending downwardly for connection to a master cylinder enclosure, a head member closing the upper end of the reservoir, a filling tube extending upwardly from the head member, a cap member closing the upper end of the filling tube and removably attached thereto, a liquid seal cup around the filling tube and held upon the head member by the cap member, an annular liquid seal skirt depending from the cap member into the cup, the device having an air vent from the tube to the cup inside of the skirt and an air vent from the cup outside of the skirt to the atmosphere, a fitting constructed for reception in the filling opening of a master cylinder enclosure comprising a closure member having thereon a rotatable block and means for securing the block to the closure member, the fitting having an air vent passage and a brake fluid filling passage extending below the air vent passage, the filling passage being connected to the brake fluid conductor of the reservoir chamber, and a venting conductor leading from the air vent passage to the upper portion of the reservoir chamber.

5. A protective device for the master cylinder of hydraulic brake systems including, a filling tube extending downwardly for connection to a master cylinder enclosure, a head member carried by the filling tube intermediate the ends thereof, the upper portion of the filling tube extending upwardly from the head member, a cap member enclosing the upper end of the filling tube and removably attached thereto, a plug depending from the cap member into the filling tube to a point adjacent the horizontal plane of the head member, there being a restricted annular space between the plug and the tube, a removable liquid seal cup around the filling tube and held upon the head member by the cap member, an annular liquid seal skirt depending from the cap member into the cup, the device having an air vent from the tube to the cup inside of the skirt and an air vent from the cup outside of the skirt to the atmosphere, the liquid seal cup comprising an open-top receptacle having inner and outer annular walls joined at their bottom portions by a closed botom wall, and the inner annular wall of the cup being closely spaced radially outwardly from the tube.

6. A protective device for the master cylinders of hydraulic brake systems including, walls enclosing a reservior chamber having a brake fluid conductor extending downwardly for connection to a master cylinder enclosure, a head member closing the upper end of the chamber, a filling tube extending upwardly from the head member, a liquid seal cup around the portion of the tube projecting above the reservoir chamber, a cap member closing the upper ends of the tube and cup, a depending liquid seal skirt carried by the cap member and extending downwardly therefrom into the cup, the device having air vents from the exterior thereof and from the tube into the cup on opposite sides of the skirt, a fitting constructed for positioning in the filling opening of a master cylinder enclosure and having an air vent passage and a brake fluid filling passage extending below the air vent passage, the filling passage being connected to the brake fluid conductor of the reservoir chamber, and a venting conductor leading from the air vent passage to the upper portion of the reservoir chamber.

References Cited in the file of this patent

UNITED STATES PATENTS

| Number | Name | Date |
|---|---|---|
| 1,874,742 | Harnsberger | Aug. 30, 1932 |
| 2,013,518 | Linde | Sept. 3, 1935 |
| 2,137,054 | Kamrath | Nov. 15, 1938 |
| 2,258,019 | Kramer et al. | Oct. 7, 1941 |
| 2,422,070 | Betlencourt | June 10, 1947 |
| 2,541,862 | Cunningham | Feb. 13, 1951 |
| 2,613,013 | Von Pelt | Oct. 7, 1952 |
| 2,638,748 | Miller | May 19, 1953 |